US012159334B2

United States Patent
Kuta et al.

(10) Patent No.: US 12,159,334 B2
(45) Date of Patent: Dec. 3, 2024

(54) SYSTEM AND METHOD FOR PERFORMING FACIAL IMAGE ANONYMIZATION

(71) Applicant: DE-IDENTIFICATION LTD., Tel Aviv (IL)

(72) Inventors: Eliran Kuta, Tel Aviv (IL); Sella Blondheim, Tel Aviv (IL); Gil Perry, Tel Aviv (IL); Yoav Hacohen, Jerusalem (IL); Amitay Nachmani, Tel Aviv (IL); Matan Ben-Yosef, Tel Aviv (IL); Or Gorodissky, Tel Aviv (IL)

(73) Assignee: DE-IDENTIFICATION LTD., Tel-Aviv (IL)

( * ) Notice: Subject to any disclaimer, the term of this patent is extended or adjusted under 35 U.S.C. 154(b) by 423 days.

(21) Appl. No.: 17/539,247

(22) Filed: Dec. 1, 2021

(65) Prior Publication Data

US 2022/0172416 A1     Jun. 2, 2022

Related U.S. Application Data

(60) Provisional application No. 63/120,274, filed on Dec. 2, 2020.

(51) Int. Cl.
  *G06T 11/60*  (2006.01)
  *G06N 3/045*  (2023.01)
  *G06N 3/08*   (2023.01)

(52) U.S. Cl.
  CPC .............. *G06T 11/60* (2013.01); *G06N 3/045* (2023.01); *G06N 3/08* (2013.01)

(58) Field of Classification Search
  None
  See application file for complete search history.

(56) References Cited

U.S. PATENT DOCUMENTS 10,552,667 B1 *   2/2020   Bogan, III ........... G06V 40/171
2020/0143079 A1   5/2020   Sohn
(Continued)

FOREIGN PATENT DOCUMENTS

CN      110826510 A   *  2/2020
DE    102020115697 A1  * 12/2021

OTHER PUBLICATIONS

Ali Seyed et al; "A Hybrid Deep Learning Architecture for Privacy—Preserving Mobile Analytis", vol. 1703.02952v5, Apr. 18, 2018, pp. 1-21.
(Continued)

*Primary Examiner* — Fan Zhang
(74) *Attorney, Agent, or Firm* — PEARL COHEN ZEDEK LATZER BARATZ LLP (57) ABSTRACT

A system and method of performing facial image anonymization may include: obtaining, by at least one processor of a first computing device, at least one first image data element, depicting a first face; using, by the at least one processor, a first neural network (NN), to encode the facial image into a first low-dimension, latent vector; using, by the at least one processor, a transformation module, adapted to modify the first latent vector, to produce an anonymized latent vector; and transmitting, by the at least one processor, the anonymized latent vector, via a communication network to a remote second computing device, wherein the second computing device is adapted to decode the anonymized latent vector into a second image data element, depicting an anonymized face.

12 Claims, 3 Drawing Sheets

(56) References Cited

U.S. PATENT DOCUMENTS

2022/0067449 A1* 3/2022 Perera .................... G06N 3/047
2022/0101577 A1* 3/2022 Chakrabarty ............. G06T 7/11
2022/0148243 A1* 5/2022 Yang .................... G06F 16/532
2022/0270310 A1* 8/2022 Kumar .................. G06T 11/203

OTHER PUBLICATIONS

European Search Report of Application No. EP 21 21 1791 mailed on Apr. 25, 2022.

* cited by examiner

SYSTEM AND METHOD FOR PERFORMING FACIAL IMAGE ANONYMIZATION

CROSS-REFERENCE TO RELATED APPLICATIONS

This Application claims the benefit of U.S. Provisional Application Ser. No. 63/120,274, filed Dec. 2, 2020, which is hereby incorporated by reference in its entirety.

FIELD OF THE INVENTION

The present invention relates generally to the field of image processing. More specifically, the present invention relates to methods and systems for performing data anonymization.

BACKGROUND OF THE INVENTION

Currently available computing systems may be configured to acquire personal information, such as facial images, and may be required to perform anonymization of the acquired data, to protect the privacy of people corresponding to that data. The term "anonymization" or "data anonymization" may refer herein to a process of removing, erasing or altering identifying information from a first, original data element (e.g., a file or data structure representing an image of a face), to produce a second data element (e.g., a second image) that may be devoid of the identifying information. Thus, the process of anonymization may secure or increase privacy protection. For example, a data element that is an image of a face may be anonymized, so as to prevent identification of the depicted face, e.g., in order to comply with privacy regulations and/or reduce potential risk in case of data breach.

SUMMARY OF THE INVENTION

The term "neural network" (NN), e.g. an NN implementing machine learning, may refer herein to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g. CPUs or graphics processing units (GPUs), or a dedicated hardware device may perform the relevant calculations.

As known in the art, currently available methods and systems for image processing may employ one or more neural networks to receive a first image, manipulate data pertaining to the first image, and produce from the manipulated data a second, manipulated image. For example, systems for facial image manipulation may: (a) receive a first image depicting a first face; (b) use a first NN, commonly referred to as an "Encoder", to encode the facial image into a low-dimension vector commonly referred to as a "latent" vector, in a "latent" vector space; (c) modify the latent vector according to specific requirements; and (d) use a second neural network, commonly referred to as a "Decoder", corresponding to the encoder, to decode the modified latent vector back to the image space, and thus produce a second, outcome facial image. The term "vector" may be used herein to refer to a list or ordered list of numbers or scalars, which may be indexed according to a specific order. As known in the art, the low-dimension vector may be referred to as "latent", in a sense that it may implement or represent a mapping of high dimensional data (e.g., the input image) to a lower dimensional data (e.g., the latent vector) with no prior convictions of how the mapping will be done, and without applying manipulations to this mapping. A low dimensional vector or data structure may have less data or information than a high dimensional vector or data structure. In other words, the artificial NN may train itself for the best configuration, and the meaning or association of high dimensional data to low dimensional data may be hidden from a programmer or a designer of the NN.

According to some embodiments of the invention, the process of image manipulation, as elaborated above, may be applied, for example on facial images to perform face anonymization. For example, embodiments of the invention may modify the latent vector in the latent vector space such that a subsequent, outcome facial image would preserve key facial attributes, such as gender, ethnicity, age, etc., while modifying identity attributes or features of the face depicted in the original image.

As known in the art, encoder and decoder NNs require extensive computing and memory resources. In fact, execution of compute-intensive and memory-intensive NNs may be practically non-feasible on edge devices where original images are captured. For example, an edge device may be, or may include a digital camera, that may be installed in a vehicle, and may have limited computational resources that may prohibit implementation of such encoder and decoder NNs.

One way of overcoming this obstacle may include uploading the acquired information, originating from an edge device (e.g., the on-vehicle digital camera), to be processed on a remote computer or server having higher computational capabilities. Alternatively, image manipulation systems may be configured to process the acquired data (e.g., the captured images) locally, using low quality neural networks. In other words, such systems may exercise a tradeoff between memory and computing resources on one hand, and the quality of image manipulation on the other. It may be appreciated by a person skilled in the art that uploading private information (e.g., an image depicting a human face) to a remote server may present a data security risk and may raise privacy concerns. On the other hand, processing the information locally on the edge device may be subject to limitations of memory and computing resources, and may thus compromise the quality of processing.

For example, the edge device may be an in-car computer, that may have limited computing and/or memory resources. This limitation may cause local operation of the decoding action on the edge device to become non-feasible. In another example, the edge device may be a mobile phone or a tablet computer, which may be incapable of running a high-quality decoder NN for generating a high-resolution anonymized image.

Embodiments of the present invention may implement or include a lightweight (e.g. non-computationally intensive and/or non-memory intensive) encoder and a lightweight anonymization transformation on the edge device, and may thus utilize computing resources on the edge device more efficiently, while adhering to privacy regulations.

Embodiments of the present invention may include a method of performing data anonymization, such as facial image anonymization. Embodiments of the method may include: obtaining, by at least one processor of a first computing device, at least one first image data element or file, depicting a first face; using, by the at least one processor, a neural network (NN), to encode the facial image into a low-dimension, latent vector; modifying the latent vector by the at least one processor, to produce an anonymized latent vector; and transmitting the anonymized latent vector via a communication network to a second computing device, adapted to decode the anonymized latent vector into a second image data element or file, depicting an anonymized face.

According to some embodiments, the latent vector may include a plurality of scalar parameters. The plurality of scalar parameters may include a first group of parameters, representing features pertaining to, or helping to specify the identity of a person. For example, the first group of parameters may represent an age, an ethnicity and/or a gender of a person depicted in the obtained image. Additionally, or alternatively, the first group may include one or more parameters pertaining to facial features of specific individuals. Such parameters may, for example, represent a distance between pupils, a width and/or length of a nose, a complexion, a hairline etc.

Additionally, or alternatively, the plurality of scalar parameters may include a second group of parameters, representing features that do not pertain to identity. For example, the second group may include parameters representing lighting, a pose of a person's face in an image, an expression of the person depicted in the image, presence of artifacts such as accessories and clothing in the image, and the like.

Embodiments of the invention may modify the latent vector by adapting a value of at least one parameter of the first group, pertaining to an identity of a depicted person, and not modify a value of a parameter of the second group, which pertains to non-identity features. In some embodiments, none of the values of the parameters of the second group, which pertains to non-identity features are modified. Thus, the modified latent vector may be referred to as anonymized, in a sense that it could not be utilized to reproduce the face of the original image. In other words, decoding of the anonymized latent vector may yield an image depicting a second face of a person, but the second person may not be identified, e.g., by a face recognition algorithm and/or by a human observer as portraying the same person as the original, first image.

Embodiments of the invention may include a system for performing anonymization of a facial image. Embodiments of the system may include a non-transitory memory device, wherein modules of instruction code are stored, and a processor associated with the memory device, and configured to execute the modules of instruction code. Upon execution of the modules of instruction code, the processor may be configured to: obtain at least one first image data element, depicting a first face; use a first NN to encode the facial image into a low-dimension, latent vector; modify the latent vector to produce an anonymized latent vector; and transmit the anonymized latent vector via a communication network to a second computing device, adapted to decode the anonymized latent vector into a second image data element, depicting an anonymized face.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Figure 1:
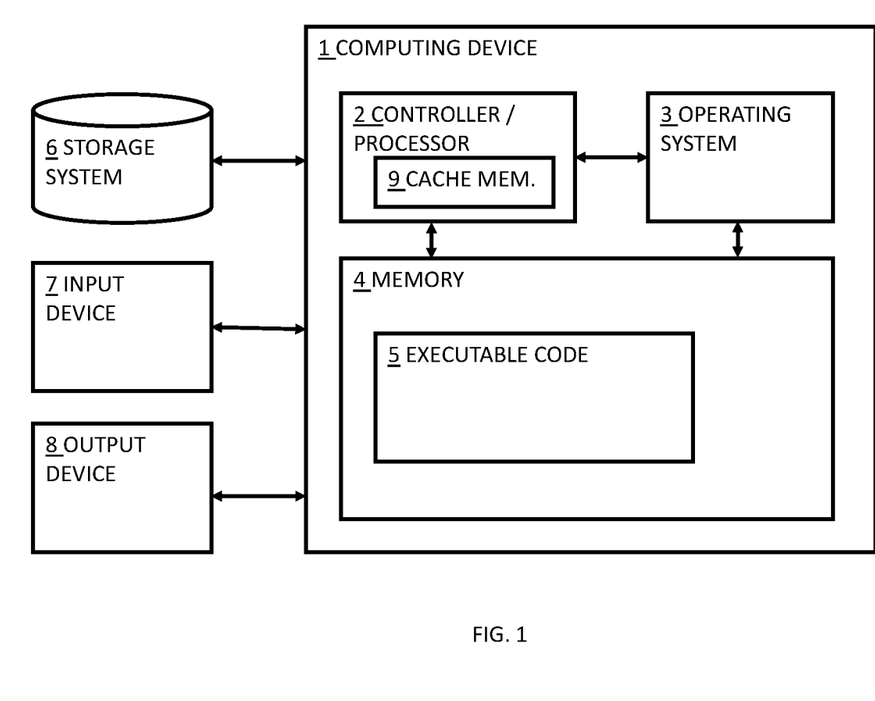
FIG. 1 is a block diagram, depicting a computing device which may be included in a system for performing data anonymization, such as facial image anonymization, according to some embodiments of the invention.

Reference is now made to FIG. 1, which is a block diagram depicting a computing device, which may be included within an embodiment of a system for performing data anonymization, according to some embodiments of the invention.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different, memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by processor or controller 2 possibly under control of operating system 3. For example, executable code 5 may be an application that may perform data anonymization (e.g., facial image anonymization), or uses or executes a NN, as described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data acquired by an edge device, that may include personal information such as an image depicting a person's face may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to controller or processor 2), a plurality of input units, a plurality of output units, a plurality of memory units, and a plurality of storage units.

Figure 2:
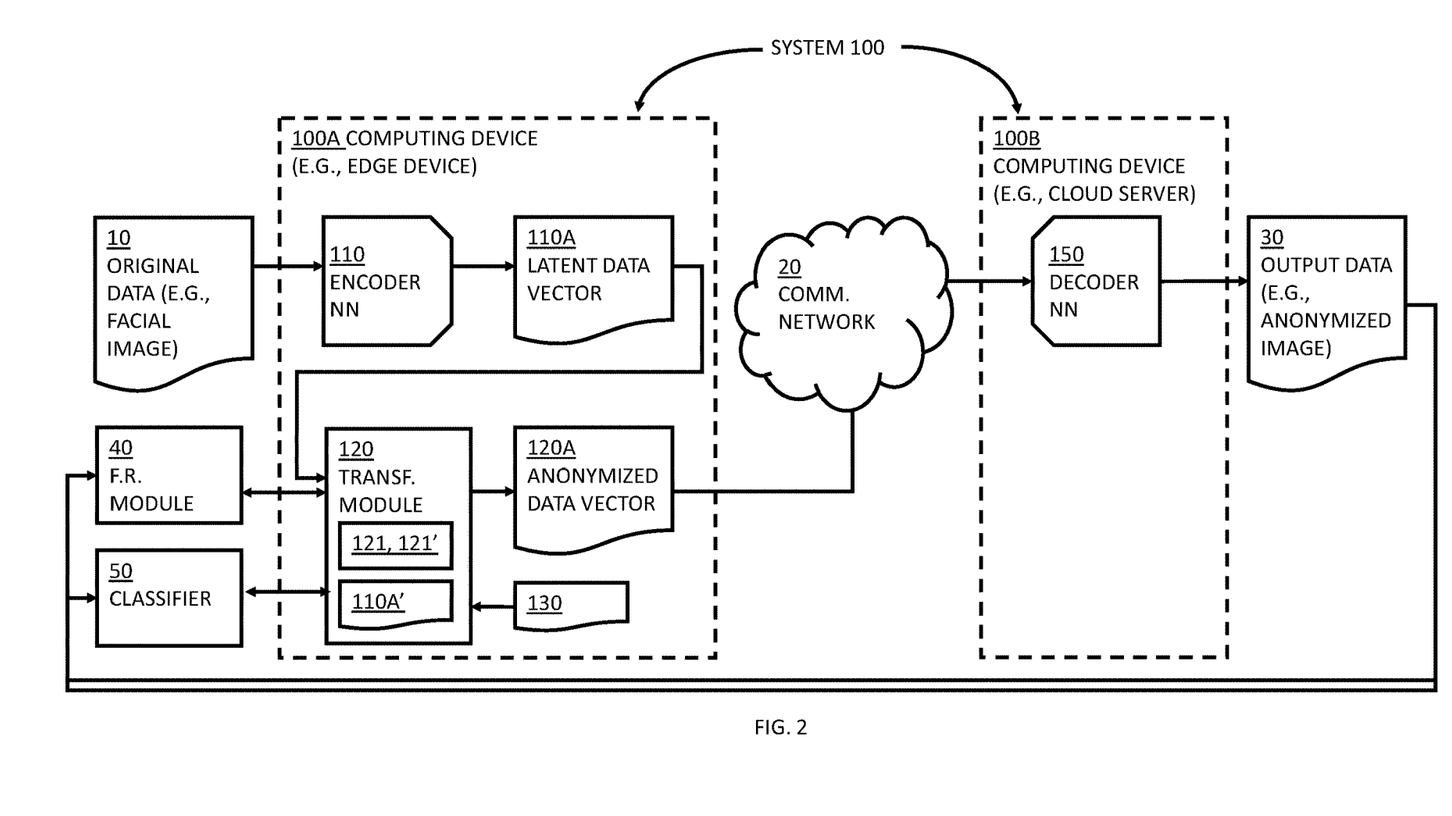
FIG. 2 is a block diagram, depicting a system for performing data anonymization, such as facial image anonymization, according to some embodiments of the invention.

Reference is now made to FIG. 2, which depicts a system 100 for performing data anonymization, such as anonymization of a facial image, according to some embodiments of the invention. According to some embodiments of the invention, components of system 100 may be implemented as software modules, hardware modules, or any combination thereof. For example, system 100 or computing devices 100A or 100B may be or may include a computing device such as computing device 1 of FIG. 1, and may be adapted to execute one or more modules of executable code (e.g., executable code 5 of FIG. 1) to perform data anonymization, as further described herein.

As shown in FIG. 2, system 100 may include a first computing device 100A that may be communicatively connected to, or associated with a second, remote (e.g., third-party) computing device 100B. Alternatively, system 100 may include both computing device 100A and computing device 100B.

According to some embodiments, computing device 100A may include at least one encoder NN 110 and computing device 100B may include at least one decoder NN 150. According to some embodiments of the invention, encoder NN 110 and decoder NN 150 may be implemented on separate computing devices. For example, encoder NN 110 may be implemented, or executed on a first computing device 100A (e.g., device 1 of FIG. 1), that may, for example be an edge device, such as an in-car computer, and may have limited processing resources or capabilities (e.g., processing power, memory space, power consumption, etc.). Decoder NN 150 may be implemented, or executed on a second computing device 100B (e.g., device 1 of FIG. 1), such as a cloud server, which may have more extensive processing capabilities. The first computing device 100A and second computing device 100B may be communicatively connected via a computer communication network 20, such as the Internet or a cellular data network, to perform methods of data manipulation or data anonymization such as facial image anonymization, as elaborated herein.

As elaborated herein, currently available systems for image manipulation may be limited by a tradeoff between: (a) limited computing and memory resources on the edge device on one hand, and (b) compromising of data security and/or data quality on the other hand. Embodiments of the present invention may take a hybrid approach, that may produce high-quality image manipulation without compromising data security.

According to some embodiments, computing device 100A may produce or obtain an original, first data element or file 10, such as a file including data of an image depicting a human face. Original, acquired data 10 (e.g., an image file of an image depicting a face) may be encoded by encoder NN 110 on the edge computing device 100A, to produce a latent data vector 110A in a "latent space", as commonly referred to in the art. Embodiments of the invention may include a data transformation module 120, adapted to manipulate the latent data vector 110A, still on edge computing device 100A, to produce a manipulated, or anonymized data vector 120A. Anonymized data vector 120A may be referred to as "anonymized", in a sense that it may represent a version of vector 110A that is anonymized, or devoid of identifying data. For example, Anonymized data vector 120A may not be used to identify or recognize a person who may be depicted in original image 10. The term "recognize" may be used in this context to refer to any type of facial recognition, including for example by a human observer and/or by a computerized facial recognition (FR) algorithm, as known in the art.

Anonymized data vector 120A may then be transmitted or uploaded, via a communication network 20 to computing device 100B, that may for example be a remote server. Computing device 100B may include a decoder NN 150, that may be adapted to decode anonymized data vector 120A, on computing device 100B, to produce a second, output data element 30, that may represent a manipulated version of original, first data element 10. For example, second data element 30 may be a second image, depicting a face of a person, that may not be identifiable or recognizable (e.g., by a human observer and/or by an FR algorithm) as pertaining to the person depicted in the image of first data element 10.

It may be appreciated by a person skilled in the art that the hybrid approach elaborated herein provides the best of two worlds: it may utilize limited processing capabilities of the edge computing device 100A, and still enable high quality facial anonymization, without sending sensitive information to a remote server.

In comparison to an alternative approach of processing the original image (e.g., data element 10) on a remote computer (e.g., 100B), embodiments of the invention may reduce the risk of sensitive-data breach, since only anonymized information (e.g., anonymized vector 120A) may be sent to remote computing device 100B.

As known in the art, a decoder NN may normally demand more computational and memory resources than a corresponding encoder NN, since restoring a high-dimensional data (e.g., image 30) from a corresponding low-dimensional representation (e.g., anonymized vector 120A) is usually a more challenging task than performing dimensionality reduction (e.g., encoding image 10 to produce latent vector 110A). Therefore, in comparison to an alternative approach of executing quality-compromised encoding and decoding on edge device 100A, embodiments of the invention may provide or allocate significantly more computational resources to encoder 110 on computing device 100A, and may thus enable better encoding quality. According to one embodiment, edge device 100A may have enough computing power to encode data element or file 10, e.g., to operate decoder NN 110, while not having enough computing power to decode anonymized vector 120A, e.g., to operate decoder NN 150. Remote computing device 100B, on the other hand may have the required computing power to decode anonymized vector 120A, e.g., to operate decoder NN 150.

Embodiments of the present invention may include a system 100 for anonymizing a data element such as an image. Embodiments of the system may operate on one or more image data elements 10 such as a digital image of a face or a video, depicting facial information, and may send an anonymized version of the image data element 10, to a remote computer (e.g., computing device 100B). The sent anonymized version of the image 10 may be decoded as a low-dimensional vector 120A, and may be suitable for decoding back, e.g., by a decoder module (e.g., decoder 150) on remote computing device 100B, so as to produce an anonymized image data element or digital image depicting an anonymized face (e.g., output data element 30).

According to some embodiments, an encoder module (e.g., encoder 110) may transform an input data element 10 such as input facial photos into a low dimensional latent vector 110A, in a latent vector space.

It may be appreciated by a person skilled in the art that low dimensional latent vector 110A may include a representation of one or more features or attributes relating to identity of a person depicted in original image 10, such as ethnicity, age, gender and the like. Additionally, or alternatively, low dimensional latent vector 110A may include a representation of one or more features or attributes that do not relate to identity of the person depicted in original image 10. Such non-identity attributes may include for example, lighting, pose, facial expression, and the like.

It may also be appreciated by a person skilled in the art that low dimensional latent vector 110A can be transformed (e.g., by a decoder NN module 150 that corresponds to encoder NN 110) back to the original facial image 10 that it represents.

According to some embodiments, computing device 100A may include a transformation module 120, that may be adapted to modify at least one latent vector 110A at the latent space in a way that alters or replaces the identity represented by latent vector 110A, while preserving non-identity attributes such as age, gender, ethnicity, etc. In other words, transformation module 120 may modify at least one identity attribute that may be included in latent vector 110A, to anonymize latent vector 110A, or produce an anonymized data vector 120A. The term "modifying", in the context of modifying a vector may refer to changing one or more data items or numbers in the vector.

Data vector 120A may be "anonymized" in a sense that it may be devoid of at least one identity feature or attribute of the face depicted in original image 10. It may be appreciated that a decoding function that may be applied (e.g., by decoder NN 150) on anonymized data vector 120A may produce an output data element 30, that is devoid of at least one identity feature (e.g., age, gender, ethnicity) of the face depicted in original image 10. In other words, data vector 120A may be "anonymized" in a sense that a face depicted in output data element (e.g., output image) 30 and a face depicted in original image 10 may not be recognized (e.g., by a human observer and/or by a computerized FR algorithm) as pertaining to the same person.

According to some embodiments of the invention transformation module 120 may include at least one machine learning (ML) based model, or a neural network model 121, trained to receive the low-dimension, latent data vector 110A, and modify latent data vector 110A to produce therefrom the anonymized latent vector 120A.

According to some embodiments, NN model 121 may be trained based on output data 30 (e.g., the anonymized output image), and/or on supervisory input from one or more face-recognition (FR) modules 40 and/or feature classifiers 50 as elaborated herein.

For example, during a training stage, computing device 100A may receive an original image data element 10, such as a facial image, and collaborate with computing device 100B to produce an output image data element 30, as elaborated herein. Computing device 100A may introduce original image data element 10 as a first input to at least one face-recognition (FR) module, and introduce output image data element 30 as a second input to the FR module 40. FR module 40 may be adapted to produce an indication of a person's identity, as known in the art. Thus, FR module 40 may output a probability that a face depicted in the original image data element 10 and a face depicted in the output image data element 30 pertain to the same person.

Additionally, computing device 100A may introduce original image data element 10 (or latent data vector 110A thereof) to at least one feature classifier 50 as a first input and introduce output image data element 30 (latent data vector 120A thereof) to the at least one feature classifier 50 as a second input. The at least one feature classifier 50 may be adapted to output an indication pertaining to a specific feature in an image, as known in the art.

For example, feature classifier 50 may be adapted to indicate an identity-invariant feature (e.g., features that may implicitly or explicitly relate to a pose, lighting, expression, etc.) of a face depicted in an image, and thus an output of feature classifier 50 may include a probability that the relevant feature (e.g., the pose) of original image data element 10 is equal to the same feature (e.g., the pose) in output image data element 30. Additionally, or alternatively, feature classifier 50 may be adapted to indicate a facial feature (e.g., features that may implicitly or explicitly relate to ethnicity, gender, etc.) of a face depicted in an image, and thus an output of feature classifier 50 may include a probability that the relevant feature (e.g., ethnicity) of original image data element 10 is equal to the same feature (e.g., ethnicity) in output image data element 30.

NN model 121 may thus be trained to adapt or modify latent data vector 110A to produce therefrom the anonymized latent vector 120A, by using output of the FR module and output of the at least one feature classifier as supervisory data, such that the first image data element and second image data element comprise the same features according to the at least one feature classifier, and do not pertain to the same identity according to the FR module. In other words, computing device 100A may train NN model 121 such that: (a) a face depicted in original image data element 10 and a face depicted in output image data element 30 do not pertain to the same person, according to the output of FR module 40, and (b) a face depicted in original image data element 10 and a face depicted in output image data element 30 have the same identity-invariant feature (e.g., pose, lighting, clothing, expression, etc.) and/or facial feature (e.g., age, gender, ethnicity) according to the output of feature classifier 50.

As known in the art, the term "supervisory data" may be used in this context to indicate data that may be used as feedback by a machine learning paradigm, in a process of training a NN model.

It may be appreciated by a person skilled in the art that the process of training NN 121 as elaborated herein may include a plurality of iterations, over a training data set pf a plurality of input original image data elements 10.

As known in the art, latent data vector 110A, as produced or output by encoder NN 110, may not include vector elements that may be easily associated or identified with specific features of original image 10 or identities of faces depicted therein. According to some embodiments, transformation module 120 may produce anonymized latent vector 120A in two stages: in a first stage, transformation module 120 may produce a second latent vector 110A' from the first latent vector 120A, that may include separate groups of parameters, each corresponding to a specific feature of original image data element 10 and/or a face depicted therein. For example, second latent vector 110A' may include at least one first group of parameters that may represent features pertaining to identity, such as features relating to proportions and/or positions of facial organs (e.g., length of nose, color of eyes, etc.), and at least one second group of parameters, representing features that do not pertain to identity, such as identity-invariant features (e.g., pose, lighting, expression, etc.). In some embodiments, second latent vector 110A' may further include at least one group of parameters that may relate to facial features that are not strictly related to identity, such as age.

According to some embodiments, transformation module 120 adapted to modify the second latent vector 110A' to produce anonymized latent vector 120A. For example, transformation module 120 may modify a value of at least one parameter of the at least one first groups of parameters (e.g., relating to features of identity), and may not modify values of parameters of the at least one second group (e.g., relating to identity-invariant features).

According to some embodiments of the invention transformation module 120 may include at least one ML based model, or NN model 121', trained to receive the low-dimension, latent data vector 110A, and modify latent data vector 110A to produce therefrom the second, separated latent vector 110A'. According to some embodiments, NN model 121' may be the same entity as NN model 121. Alternatively, NN model 121' may be a distinct entity, separate from NN model 121.

According to some embodiments, NN model 121' may be trained based on output data 30 (e.g., the anonymized output image), and/or on supervisory input from one or more FR modules 40 and/or feature classifiers 50, as elaborated herein.

During a training stage, computing device 100A may receive an original image data element 10, such as a facial image, and collaborate with computing device 100B to produce an output image data element 30, as elaborated herein. Computing device 100A may introduce original image data element 10 as a first input to at least one FR module, and introduce output image data element 30 as a second input to the FR module 40. As explained herein, FR module 40 may output a probability that a face depicted in the original image data element 10 and a face depicted in the output image data element 30 pertain to the same person.

Additionally, computing device 100A may introduce original image data element 10 to at least one feature classifier 50 as a first input and introduce output image data element 30 to the at least one feature classifier 50 as a second input. As elaborated herein, each feature classifier 50 may be adapted to output probability that that a relevant feature (e.g., an identity-related feature, such as node length or an identity-invariant feature such as a pose) of original image data element 10 is equal to the same feature in output image data element 30.

NN model 121' may thus be trained to adapt or modify latent data vector 110A to produce therefrom a latent data vector 110A' that is separated to groups of feature-specific parameters, by using output of the FR module and output of the at least one feature classifier as supervisory data. In other words, NN model 121' may produce latent data vector 110A' such that it may include at least one first group of parameters, representing features pertaining to identity, and at least one second group of parameters, representing features that do not pertain to identity.

According to some embodiments, transformation module 120 may produce anonymized latent vector 120A by changing a value of at least one parameter of latent vector 110A' that is included in a group of parameters that pertains to, or represents identity-related features.

For example, NN model 121 may be trained to produce anonymized latent vector 120A as elaborated above, by using latent vector 110A' as input instead of 110A.

In another example, transformation module 120 may receive (e.g., via input device 7 of FIG. 1) a rule set 130, that may include a required change in order to achieve anonymization, and apply at least one rule in the rule set 130 on at least one parameter of latent vector 110A' to obtain anonymized latent vector 120A.

For example, latent vector 110A' may include two groups of parameters, as in the following example, Ex 1:

| G1 | G1 | G1 | G2 | G2 | G2 | G2 |
|----|----|----|----|----|----|----|
| V1 | V2 | V3 | V4 | V5 | V6 | V7 |

EX. 1

Where G1 includes parameters pertaining to identity (e.g., parameters that are explicitly or explicitly related to eye color, nose shape, etc.), and having the values [V1, V2, V3], and G2 includes parameters that are identity-invariant (e.g., parameters that are explicitly or explicitly related to face elevation, position, lighting, etc.), and having the values [V4, V5, V6, V7]. Rule set 130 may include, for example, a rule that states that for a specific combination of V1, V2 and V3, the change in identity may be obtained by increasing V3 by 10%. In this example, the outcome anonymized latent vector 120A may be:

| G1 | G1 | G1    | G2 | G2 | G2 | G2 |
|----|----|-------|----|----|----|----|
| V1 | V2 | V3 * 1.1 | V4 | V5 | V6 | V7 |

Figure 3:
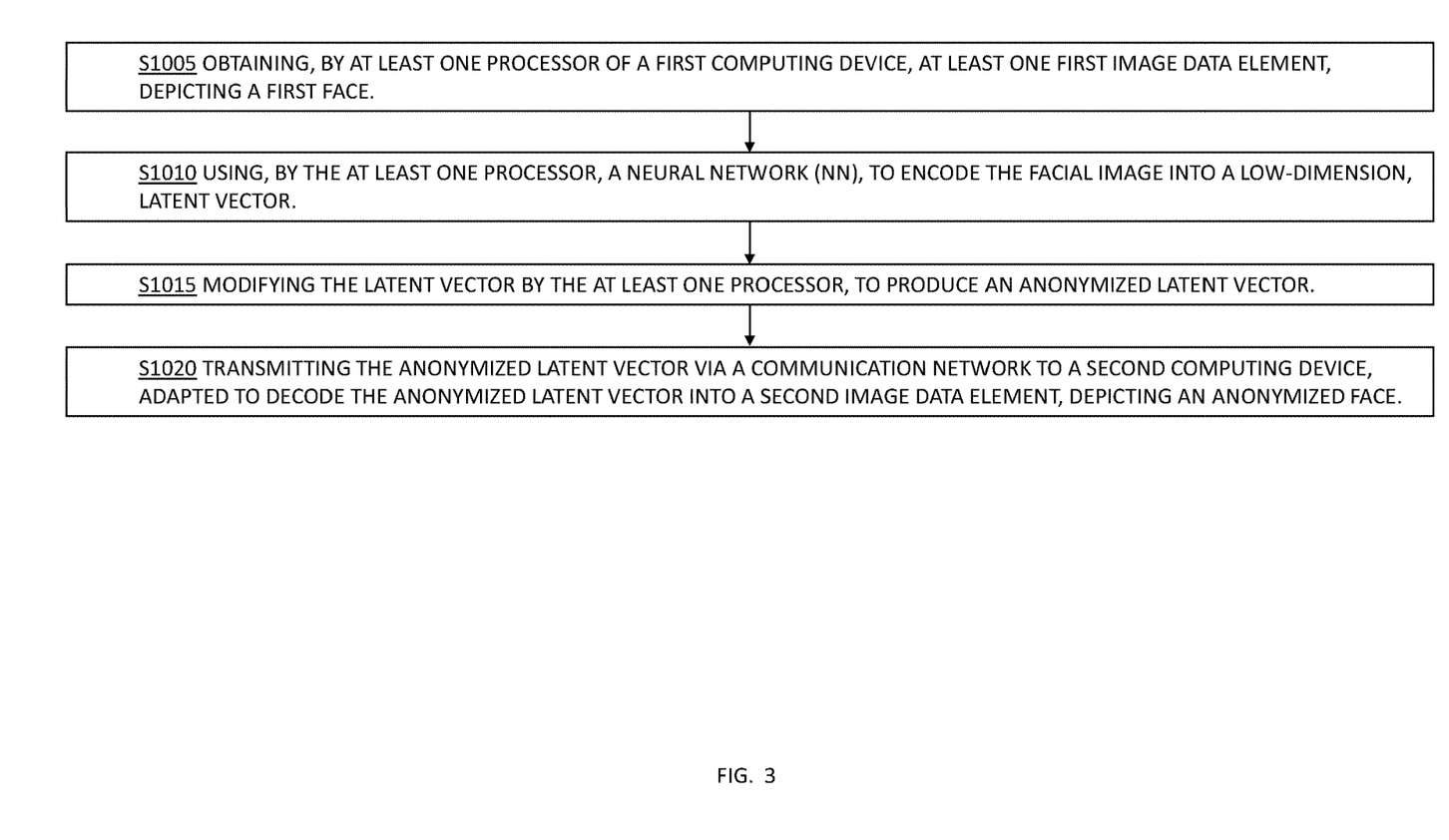
FIG. 3 is a flow diagram, depicting a method of performing data anonymization, such as facial image anonymization, according to some embodiments of the invention.

Reference is now made to FIG. 3, which is a flow diagram depicting a method for performing data anonymization, such as anonymization of a facial image, by at least one processor, according to some embodiments of the invention.

As shown in step S1005, at least one first processor (e.g., processor 2 of FIG. 1) of a first computing device (e.g., 100A of FIG. 2) may obtain an original data element (e.g., data element 10 of FIG. 2). For example, the at least one first processor of computing device 100A may collaborate with a digital camera, and may obtain therefrom an original data element or file 10 that is, or includes an image of a first face. Additionally, or alternatively, the at least one first processor of computing device 100A may collaborate with a digital camera, and obtain therefrom a sequence of images such as a video sequence, depicting a first face, and may sample or select at least one first original image depicting the first face.

As shown in step S1010, the at least one first processor may utilize a first NN, to encode the original data element 10 (e.g., the facial image) into a low-dimension, latent vector (e.g., latent data vector 110A of FIG. 2).

For example, the first NN may be an encoder neural network, such as encoder NN 110 of FIG. 2, and may be included in, or installed in the first computing device 100A of the first processor. As elaborated herein, the at least one first processor may utilize encoder NN 110 to produce latent data vector 110A which may represent original data element 10 in a latent vector space, as known in the art.

As shown in step S1015, the at least one first processor may modify latent vector 110A, to produce an anonymized latent vector. For example, as elaborated herein (e.g., in relation to FIG. 2), first computing device 100A may include a transformation module (e.g., transformation module 120 of FIG. 2), adapted to change at least one data element included in latent data vector 110A to produce an anonymized data vector, such as anonymized data vector 120A of FIG. 2.

For example, latent data vector 110A may include a plurality of values of neural nodes of an output layer of encoder NN 110. The at least one first processor of computing device 100A may utilize transformation module 120 to change at least one value of the plurality of values of neural nodes of an output layer of encoder NN 110, to produce anonymized data vector 120A. According to some embodiments, some of the values of neural nodes of an output layer of encoder NN 110 included in latent data vector 110A may be implicitly associated or related to identity-invariant features of image data element 10, e.g., some parameters in latent data vector 110A, while not explicitly associated with an identity-invariant feature, may implicitly relate to an identity-invariant feature such as pose, lighting, expression, etc. Similarly, some of the values of neural nodes of an output layer of encoder NN 110 included in latent data vector 110A may be implicitly associated or related to identity features or facial features of image data element 10 e.g., some parameters in latent data vector 110A, while not explicitly associated with an identity feature, may implicitly relate to an identity feature such as ethnicity, gender, etc. For example, parameters in latent data vector 110A may be classified by feature classifier 50, as disclosed herein.

According to some embodiments, latent data vector 110A may include a first group of parameters and a second group of parameters. The first group of parameters may represent features pertaining to identity. For example, original data element 10 may be an image depicting a first face. In such conditions, the first group of parameters may represent features pertaining to identity of, or useful in recognizing or identifying, the depicted person, including for example ethnicity, gender, age, location and proportions of facial features or organs (e.g., skin, eyes, mouth, nose, etc.), and the like. The second group of parameters may represent features that do not pertain to identity, such as a pose, lighting, background elements, accessories (e.g., eye glasses, earrings, necklaces, etc.). According to some embodiments, transformation module 120 may be configured to change or modify the latent vector by modifying a value of at least one parameter within the vector associated with an item from the first group, representing features of identity, and not modifying a value of a parameter of the second group. The resulting anonymized data vector 120A may, for example, represent a change in a complexion of the depicted person's skin, or a change in a distance or proportion between the depicted person's eyes. Anonymized data vector 120A may thus be referred to as "anonymized" in a sense that it may represent a change in one or more features of the depicted person's identity.

As shown in step S1020, the at least one first processor may transmit the anonymized latent vector 120A via a communication network 20 (e.g., the internet, a cellular data network, and the like) to a second, remote computing device such as computing device 100B of FIG. 2. The term "remote" may be used in this context to indicate that computing device 100A and computing device 100B may not be the same device, may not be included in the same machine or device and/or may not be located at the same geographic location. Second computing device may receive the anonymized latent vector 120A via communication network 20.

According to some embodiments of the invention, second computing device 100B may include or execute a decoder neural network 150 that corresponds to encoder NN 110, in a sense that decoder neural network 150 may be adapted to decode anonymized latent data vector 120A into a second data element 30, such as an image depicting an anonymized face.

Embodiments of the invention may include a practical application for manipulating (e.g., anonymizing) data elements such as images and/or video sequences. According to some embodiments of the invention, system 100 may provide an improvement over the technology of currently available systems for data manipulation and NN use, where data element 10 (e.g., a facial image) may be encoded and then decoded back on the same computing device. As elaborated herein, system 100 may divide the work between a first computing device (e.g., an edge device 110A, that may have limited computing resources) and a remote computing device (e.g., a remote computer or server 110B): The encoding (e.g., by encoder NN 110) and the anonymization of latent data vectors at the latent space (e.g., by transformation module 120) may be performed on the edge device. The resulting anonymized data vector 120A may be sent to a remote computing device 100B and decoded, e.g., by decoder NN 150 on remote computing device 100B to produce an output data element 30, such as an anonymized facial image 30. Embodiments may improve the operation of NNs, resulting in more efficient use of these computing devices.

It may be appreciated by a person skilled in the art that by performing the anonymization process on the edge computing device 100A, embodiments of the system may improve computer networks and avoid sending sensitive information, such as data pertaining to an identity of a depicted person to a remote computing device 100B such as a cloud server. Additionally, by performing the decoding operation on remote computing device 100B (e.g., a cloud server, rather than on edge computing device 100A), system 100 may improve the operation of such computing devices, save computation and memory resources, and enable allocation of more resources for the encoder 100A, to produce high-quality anonymization results.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of performing facial image anonymization, the method comprising:
   obtaining, by at least one processor of a first computing device, a first image data element, depicting a first face;
   using, by the at least one processor, a first neural network (NN), to encode the first image data element into a first latent vector;
   using, by the at least one processor, a transformation module, wherein the transformation module comprises at least one second NN, trained to receive the first latent vector and produce therefrom an anonymized latent vector; and
   transmitting, by the at least one processor, the anonymized latent vector, via a communication network to a remote second computing device,
   wherein the second computing device is adapted to decode the anonymized latent vector into a second image data element, depicting an anonymized face,
   wherein training the at least one second NN comprises:
      introducing the first image data element as a first input to a face-recognition (FR) module;
      introducing the second image data element as a second input to the FR module;
      introducing the first latent vector to at least one feature classifier as a first input;
      introducing the anonymized latent vector to the at least one feature classifier as a second input; and
   using output of the FR module and output of the at least one feature classifier as supervisory data, such that the first image data element and second image data element comprise the same features according to the at least one feature classifier, and do not pertain to the same identity according to the FR module.

2. The method of claim 1, wherein the anonymized latent vector comprises at least one first group of parameters, representing features pertaining to identity, and at least one second group of parameters, representing features that do not pertain to identity.

3. The method of claim 2 wherein the transformation module is adapted to produce the anonymized latent vector by modifying a value of at least one parameter of the at least one first group, and not modifying a value of at least one parameter of the at least one second group.

4. The method of claim 1, wherein the anonymized face is not identified by a face recognition algorithm as portraying the same person as the first face.

5. The method of claim 1, wherein the output of the FR module comprises a probability that a face depicted in the first image data element and a face depicted in in the second image data element pertain to the same person and wherein output of the at least one feature classifier comprises a probability that at least one feature of the first image data element is equal to the same feature in the second image data element.

6. A method of performing facial image anonymization, the method comprising:
   obtaining, by a processor of a first computing device, a first digital image of a face;
   encoding, by the processor, the first digital image into a first latent vector;
   modifying, by the processor, the first latent vector, using at least one second NN, trained to receive the first latent vector and to produce therefrom an anonymized latent vector; and
   transmitting, by the processor, the anonymized latent vector to a second computing device,
   wherein the second computing device is adapted to decode the anonymized latent vector into a second digital image, depicting an anonymized face,
   wherein training the at least one second NN comprises:
      introducing the first digital image as a first input to a face-recognition (FR) module;
      introducing the second digital image element as a second input to the FR module;
      introducing the first latent vector to at least one feature classifier as a first input;
      introducing the anonymized latent vector to the at least one feature classifier as a second input; and
   using output of the FR module and output of the at least one feature classifier as supervisory data, such that the first digital image and second digital image comprise the same features according to the at least one feature classifier, and do not pertain to the same identity according to the FR module.

7. The method of claim 6, wherein the output of the FR module comprises a probability that a face depicted in the first image data element and a face depicted in in the second image data element pertain to the same person and wherein output of the at least one feature classifier comprises a probability that at least one feature of the first image data element is equal to the same feature in the second image data element.

8. A system for performing anonymization of a facial image, the system comprising: a non-transitory memory device, wherein modules of instruction code are stored, and a processor associated with the memory device, and configured to execute the modules of instruction code, whereupon execution of said modules of instruction code, the processor is further configured to:
   obtain a first image data element, depicting a first face;
   use a first neural network (NN) to encode the first image data element into a first latent vector;
   modify the first latent vector, using at least one second NN, trained to receive the first latent vector and to produce therefrom an anonymized latent vector; and
   transmit the anonymized latent vector via a communication network to a second, remote computing device, adapted to decode the anonymized latent vector into a second image data element, depicting an anonymized face,
   wherein training the at least one second NN comprises:
      introducing the first digital image as a first input to a face-recognition (FR) module;
      introducing the second digital image element as a second input to the FR module;
      introducing the first latent vector to at least one feature classifier as a first input;
      introducing the anonymized latent vector to the at least one feature classifier as a second input; and
   using output of the FR module and output of the at least one feature classifier as supervisory data, such that the first digital image and second digital image comprise the same features according to the at least one feature classifier, and do not pertain to the same identity according to the FR module.

9. The system of claim 8,
   wherein the anonymized latent vector comprises a first group of parameters representing features pertaining to identity, and a second group of parameters representing features that do not pertain to identity, and
   modifying the second latent vector.

10. The system of claim 9 wherein the processor is configured produce the anonymized latent vector by modifying a value of at least one parameter of the first group, and not modifying a value of at least one parameter of the second group.

11. The system of claim 8, wherein the anonymized face is not identified by a face recognition algorithm as portraying the same person as the first face.

12. The system of claim 8, wherein the output of the FR module comprises a probability that a face depicted in the first image data element and a face depicted in in the second image data element pertain to the same person and wherein output of the at least one feature classifier comprises a probability that at least one feature of the first image data element is equal to the same feature in the second image data element.

* * * * *